United States Patent
Bauer et al.

(10) Patent No.: US 12,512,712 B2
(45) Date of Patent: Dec. 30, 2025

(54) ROTOR OF AN ELECTRIC MACHINE DESIGNED AS A PERMANENTLY EXCITED SYNCHRONOUS MACHINE, ELECTRIC MACHINE AND MOTOR VEHICLE

(71) Applicant: Dr. Ing. h.c. F. Porsche Aktiengesellschaft, Stuttgart (DE)

(72) Inventors: David Bauer, Asperg (DE); Johannes Wende, Heilbronn (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 208 days.

(21) Appl. No.: 18/401,739

(22) Filed: Jan. 2, 2024

(65) Prior Publication Data

US 2024/0243626 A1 Jul. 18, 2024

(30) Foreign Application Priority Data

Jan. 13, 2023 (DE) ..................... 10 2023 100 775.0

(51) Int. Cl.
  *H02K 1/27* (2022.01)
  *H02K 1/276* (2022.01)
(52) U.S. Cl.
  CPC ......... *H02K 1/276* (2013.01); *H02K 2213/03* (2013.01)
(58) Field of Classification Search
  CPC .. H02K 1/276; H02K 2213/03; H02K 1/2766; H02K 21/14
  See application file for complete search history.

(56) References Cited

U.S. PATENT DOCUMENTS

| 10,658,891 | B2 | 5/2020 | Liu et al. | |
| 2017/0063187 | A1* | 3/2017 | Hao | H02K 21/14 |
| 2020/0153296 | A1 | 5/2020 | Albieri et al. | |
| 2021/0152042 | A1* | 5/2021 | Valin | H02K 1/276 |

(Continued)

FOREIGN PATENT DOCUMENTS

| CN | 203251159 U | 10/2013 |
| CN | 204205765 U | 3/2015 |
| CN | 206149045 U | 5/2017 |

(Continued)

*Primary Examiner* — Thomas Truong
(74) *Attorney, Agent, or Firm* — LEYDIG, VOIT & MAYER, LTD.

(57) ABSTRACT

A rotor of an electrical machine designed as a permanently excited synchronous machine includes a rotor base body having pocket-like recesses and permanent magnets positioned in the pocket-like recesses and poles which, viewed in a circumferential direction, are arranged alternately next to one another and form pole pairs. In a region of each pole, radially inner pocket-like recesses with radially inner permanent magnets arranged therein form a radially inner permanent magnet group and radially outer pocket-like recesses with radially outer permanent magnets arranged therein form a radially outer permanent magnet group. In a region of the respective radially inner and respective radially outer permanent magnet group, a first longitudinal center axis of a permanent magnet accommodated in a respective central pocket-like recess extends perpendicularly to a partly curved line which extends in a radial direction of the rotor and centrally divides the respective pole in the circumferential direction.

17 Claims, 2 Drawing Sheets

(56) References Cited

U.S. PATENT DOCUMENTS

2022/0190657 A1    6/2022  Tokat et al.

FOREIGN PATENT DOCUMENTS

| CN | 211859752 U    | 11/2020 |
| DE | 102016125708 A1 | 6/2017 |
| DE | 102018123706 A1 | 3/2020 |
| DE | 102018219244 A1 | 5/2020 |
| GB | 2600698 A      | 5/2022 |
| JP | 2020014336 A   | 1/2020 |

* cited by examiner

ROTOR OF AN ELECTRIC MACHINE DESIGNED AS A PERMANENTLY EXCITED SYNCHRONOUS MACHINE, ELECTRIC MACHINE AND MOTOR VEHICLE

CROSS REFERENCE TO RELATED APPLICATIONS

This application claims benefit to German Patent Application No. DE 10 2023 100 775.0, filed on Jan. 13, 2023, which is hereby incorporated by reference herein.

FIELD

The invention relates to a rotor of an electric machine designed as a permanently excited synchronous machine. Furthermore, the invention relates to an electric machine and a motor vehicle.

BACKGROUND

The basic design of an electric machine is known from practice. Thus, an electric machine has a housing and a stator. The stator is also referred to as the stand. Furthermore, an electric machine has a rotor. The rotor is also referred to as the runner. The rotor is rotatably mounted in the housing.

DE 10 2018 219 244 A1 discloses a rotor of an electric machine having a rotor base body with pocket-like recesses and magnets positioned in the pocket-like recesses. The rotor has poles that form pole pairs. In the region of each pole, radially inner pocket-like recesses with radially inner magnets arranged therein form a radially inner magnet group and radially outer pocket-like recesses with radially outer magnets arranged therein form a radially outer magnet group, wherein in the region of the respective inner and respective outer magnet group a first longitudinal center axis of a magnet accommodated in a central pocket-like recess runs perpendicular to the radial direction of the rotor, and wherein, in the region of the respective inner and respective outer magnet group, second longitudinal center axes of magnets accommodated in lateral pocket-like recesses extend obliquely to the radial direction of the rotor, such that the second longitudinal center axes of magnets of the respective magnet group accommodated on both sides of a central pocket-like recess in corresponding lateral pocket-like recesses diverge radially outwardly. The magnets of the respective magnet group are arranged C-shaped or V-shaped to each other.

DE 10 2106 125 708 A1, CN 204 205 765 U, CN 206 149 045 U, and CN 203 251 159 U disclose further rotors of an electric machine.

SUMMARY

In an embodiment, the present disclosure provides a rotor of an electrical machine designed as a permanently excited synchronous machine, comprising a rotor base body having pocket-like recesses and permanent magnets positioned in the pocket-like recesses and poles which, viewed in a circumferential direction, are arranged alternately next to one another and form pole pairs. In a region of each pole, radially inner pocket-like recesses with radially inner permanent magnets arranged therein form a radially inner permanent magnet group and radially outer pocket-like recesses with radially outer permanent magnets arranged therein form a radially outer permanent magnet group. In a region of the respective radially inner and respective radially outer permanent magnet group, a first longitudinal center axis of a permanent magnet accommodated in a respective central pocket-like recess extends perpendicularly to a partly curved line which extends in a radial direction of the rotor and centrally divides the respective pole in the circumferential direction. In the region of the respective radially inner and respective radially outer permanent magnet group, second longitudinal center axes of permanent magnets accommodated in respective lateral pocket-like recesses extend to the partly curved line of the respective pole such that the second longitudinal center axes of permanent magnets of the respective permanent magnet group accommodated on both sides of a respective central pocket-like recess in corresponding lateral pocket-like recesses diverge radially outward. Center points of permanent magnets of the radially inner permanent magnet groups of the poles accommodated in the central pocket-like recesses lie on a circular contour having a first radius, wherein a ratio between the first radius and an outer radius of the rotor is between 0.6 and 0.8. Center points of permanent magnets of the radially inner permanent magnet groups of the poles accommodated in first lateral pocket-like recesses and center points of permanent magnets of the radially inner permanent magnet groups of the poles accommodated in second lateral pocket-like recesses lie on a circular contour with a second radius, wherein a ratio between the second radius and the outer radius of the rotor is between 0.65 and 0.9. Center points of permanent magnets of the radially outer permanent magnet groups of the poles accommodated in the central pocket-like recesses lie on a circular contour having a third radius, wherein a ratio between the third radius and the outer radius of the rotor is between 0.78 and 0.95. Center points of permanent magnets of the radially outer permanent magnet groups of the poles accommodated in first lateral pocket-like recesses and center points of permanent magnets of the radially outer permanent magnet groups of the poles accommodated in second lateral pocket-like recesses lie on a circular contour with a fourth radius, wherein a ratio between the fourth radius and the outer radius of the rotor is between 0.8 and 0.95. The first radius is smaller than the second radius. The second radius is smaller than the third radius. The third radius is smaller than the fourth radius.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
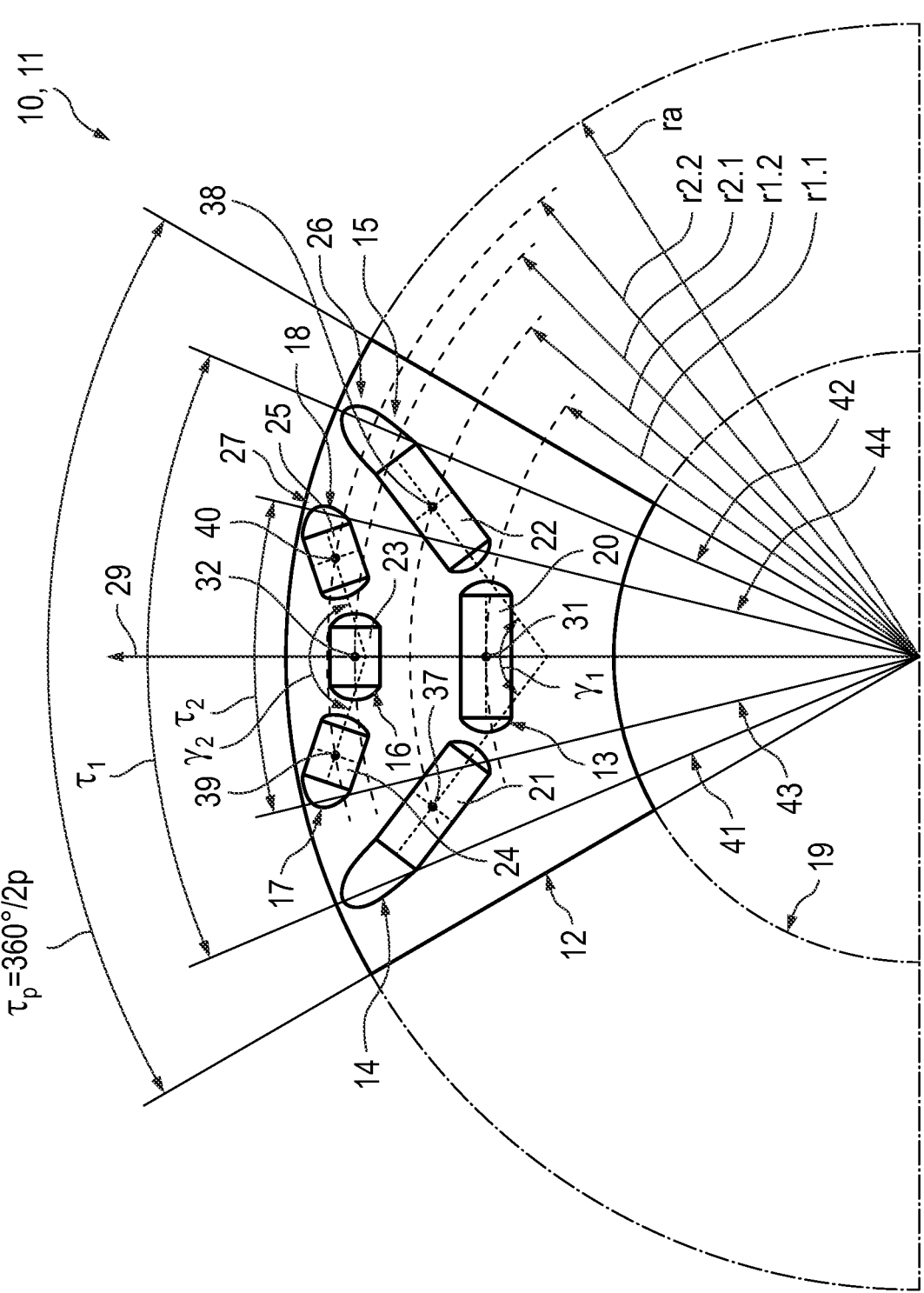
FIG. 1 illustrates a schematic section of a rotor of an electric machine in the form of a permanently excited synchronous machine, which serves as a drive unit in a motor vehicle.

In an embodiment, the present invention provides a rotor of an electrical machine designed as a permanently excited synchronous machine, which is lighter, requires little installation space and has a high torque density and high speed stability.

Further, an electric machine having such a rotor and a motor vehicle having an electric machine comprising such a rotor are to be provided.

In the rotor according to an embodiment of the invention, center points of permanent magnets of the radially inner permanent magnet groups of the poles accommodated in central pocket-like recesses lie on a circular contour having a first radius, wherein a ratio between the first radius and an outer radius of the rotor is between 0.6 and 0.8.

In the rotor of an embodiment of the invention, center points of permanent magnets of the radially inner permanent magnet groups accommodated in first lateral pocket-like recesses and center points of permanent magnets of the radially inner permanent magnet groups accommodated in second lateral pocket-like recesses also lie on a circular contour having a second radius, wherein a ratio between the second radius and the outer radius of the rotor is between 0.65 and 0.9. The respective first and second lateral pocket-like recesses are disposed on opposite sides of the respective central pocket-like recess, as viewed in the circumferential direction.

In the rotor according to an embodiment of the invention, center points of permanent magnets of the radially outer permanent magnet groups accommodated in central pocket-like recesses also lie on a circular contour having a third radius, a ratio between the third radius and the outer radius of the rotor being between 0.78 and 0.95.

In the rotor according to an embodiment of the invention, center points of permanent magnets of the radially outer permanent magnet groups accommodated in first lateral pocket-like recesses and center points of permanent magnets of the radially outer permanent magnet groups accommodated in second lateral pocket-like recesses also lie on a circular contour having a fourth radius, wherein a ratio between the fourth radius and the outer radius of the rotor is between 0.8 and 0.95. The respective first and second lateral pocket-like recesses are disposed on opposite sides of the respective central pocket-like recess, as viewed in the circumferential direction.

In the rotor according to an embodiment of the invention, the first radius is smaller than the second radius, the second radius is smaller than the third radius and the third radius is smaller than the fourth radius.

A rotor according to an embodiment of the invention, in which the first radius, the second radius, the third radius and the fourth radius meet the above design parameters, has a low weight, requires little installation space, and has a high torque density and high speed stability.

Preferably, the radially outwardly diverging second longitudinal center axes of each radially inner permanent magnet group include a first angle $\gamma 1$ between 105° and 145°, with the radially outwardly diverging second longitudinal center axes of each radially outer permanent magnet group including a second angle $\gamma 2$ between 125° and 160°.

The first angle $\gamma 1$ is smaller than the second angle $\gamma 2$. The first and second angles also serve to reduce the weight and space requirements of the rotor and to increase the torque density and speed stability of the same.

Preferably, a straight line extending through the center point of the rotor and a circumferentially outer point of a permanent magnet of the radially inner permanent magnet group of a respective pole accommodated in a first lateral pocket-like recess and a straight line extending through the center point of the rotor and a circumferentially outer point of a permanent magnet of the radially inner permanent magnet group of the respective pole accommodated in a second lateral pocket-like recess include a third angle $\tau 1$ which is between 125° and 155° divided by the number of the pole pairs, wherein a straight line extending through the center point of the rotor and a circumferentially outer point of a permanent magnet of the radially outer permanent magnet group of the respective pole accommodated in a first lateral pocket-like recess, and a straight line extending through the center point of the rotor and a circumferentially outer point of a permanent magnet of the radially outer permanent magnet group of the respective pole accommodated in a second lateral pocket-like recess include a fourth angle $\tau 2$ which is between 70° and 105° divided by the number of the pole pairs.

The third angle $\tau 1$ is larger than the fourth angle $\tau 2$. The third angle and the fourth angle also serve to reduce the installation space requirement and weight of the rotor and to increase its torque density and speed stability.

Preferably, the outer radius of the rotor is between 50 mm and 80 mm. Then, if the outer radius of the rotor is between 50 mm and 80 mm and thus its diameter between 100 mm and 160 mm, an electric machine can be provided which can be integrated advantageously as a drive unit in a motor vehicle.

Preferably, the pocket-like recesses receive the permanent magnets and are partially filled with air. This makes it possible to further increase torque density and speed stability while keeping weight and installation space to a minimum.

Preferably, a distance between immediately adjacent pocket-like recesses of a respective permanent magnet group is between 0.4 mm and 2.5 mm, wherein a distance of the lateral pocket-like recesses of the respective permanent magnet group from an outer wall of the rotor is also between 0.4 mm and 2.5 mm. This provides sufficient material thickness between the respective pocket-like recesses and between the pocket-like recesses and the outer wall of the rotor to provide sufficient rotational speed strength even for high rotational speeds of the rotor of more than 10,000 or even more than 15,000 rpm.

Preferred further developments of the invention follow from the following description.

Without being restricted thereto, embodiment examples of the invention are explained in greater detail with reference to the drawings.

FIG. 1 shows a section of a rotor 10 of an electric machine 11 designed as a permanently excited synchronous machine.

The electric machine 11 is preferably designed as a drive unit of a motor vehicle, namely a hybrid vehicle or electric vehicle.

A stator of the electric machine 11 adjoins the rotor 10 radially outwards. The rotor 10 and the stator are accommodated in a housing of the electrical machine 11, the rotor 10 being rotatably mounted in the housing of the electrical machine 11.

FIG. 1 shows a section of the rotor 10 in the region of a pole 12 of the rotor 10, wherein a plurality of poles 12 are arranged adjacent to one another as viewed in the circumferential direction and form pole pairs.

Two poles each form a pole pair. p corresponds to the number of pole pairs of the rotor 10.

The circumferential extent $\tau p$ of a pole 12 is 360°/2p.

As already explained, the rotor 10 has several poles 12. The poles 12 are arranged adjacent to each other in the circumferential direction and form pole pairs. In this case, the poles 12 are formed by permanent magnets 20, 21, 22, 23, 24, 25 accommodated in pocket-like recesses 13, 14, 15, 16, 17, 18 of a rotor base body 19, the rotor base body 19 preferably being arranged on a rotor shaft.

In the region of each pole 12, radially inner pocket-like recesses 13, 14, 15 with the radially inner magnets 20, 21, 22 arranged therein form a radially inner permanent magnet group 26, wherein in the region of each pole 20, radially outer pocket-like recesses 16, 17, 18 with the radially outer permanent magnets 23, 24, 25 accommodated therein form a respective radially outer permanent magnet group 27.

In the region of the radially inner permanent magnet group 26 of the respective pole of the rotor 10, a first longitudinal center axis 28 of the permanent magnet 20 accommodated in the central pocket-like recess 13 extends perpendicular to a partly curved line 29 extending in the radial direction of the rotor 10, which divides the respective pole 12 centrally in the circumferential direction. Also in the region of the outer permanent magnet group 27, a first longitudinal center axis 30 of the permanent magnet 23 accommodated in the central recess 16 of the radially outer permanent magnet group 27 runs perpendicular to this partly curved line 29, with center points 31, 32 of these permanent magnets 20, 23 of the two permanent magnet groups 26, 27 of the respective pole 12 positioned in the central pocket-like recesses 13, 16 lying on the partly curved line 29, which runs in the radial direction and, viewed in the circumferential direction, divides the respective pole 12 centrally.

The center points 31 of permanent magnets 20 of the radially inner permanent magnet groups 26 of the poles 12 accommodated in the central pocket-like recesses 13 lie on a circular contour having a first radius r1.1, wherein a ratio r1.1/ra between the first radius r1.1 and an outer radius ra of the rotor is between 0.6 and 0.8.

The center points 32 of permanent magnets 23 of the radially outer permanent magnet groups 27 of the poles 12 accommodated in the central pocket-like recesses 16 lie on a circular contour having a third radius r2.1, wherein a ratio r2.1/ra between the third radius r2.1 and the outer radius ra of the rotor 10 is between 0.78 and 0.95.

In the region of the radially inner permanent magnet group 26 of the respective pole 12, second longitudinal center axes 33, 34 of the permanent magnets 21, 22, which, viewed in the circumferential direction, are accommodated in the lateral pocket-like recesses 14, 15 positioned on either side of the central pocket-like recesses 13, extend obliquely to the partly curved line 29 of the respective pole 12, in such a way that these second longitudinal center axes 33, 34 diverge radially outwards.

This is also the case for the second longitudinal center axes 35, 36 of the permanent magnets 24, 25 of the radially outer permanent magnet group 27 of the respective pole 12 arranged in the two lateral pocket-like recesses 17, 18 as viewed in the circumferential direction. These second longitudinal center axes 35, 36 also run at an angle to the partly curved line 29 of the respective pole 12, namely in such a way that they diverge radially outward.

Center points 37, 38 of the permanent magnets 21, 22 of the radially inner permanent magnet group 26 accommodated in the lateral recesses 14, 15 arranged on different sides of the central recess 13 as viewed in the circumferential direction lie on a circular contour having a second radius r1.2, a ratio r1.2/ra between this second radius r1.2 and the outer radius ra of the rotor 10 being between 0.65 and 0.9.

Center points 39, 40 of the permanent magnets 24, 25 of the radially outer permanent magnet groups 27 of the poles 12 arranged in the lateral pocket-like recesses 17, 18 arranged on different sides of the central pocket-like recess 16 as viewed in the circumferential direction lie on a circular contour having a fourth radius r2.2, wherein a ratio r2.2/ra between the fourth radius r2.2 and the outer radius ra of the rotor 10 is between 0.8 and 0.95.

The first radius r1.1 is smaller than the second radius r1.2. The second radius r1.2 is smaller than the third radius r2.1. The third radius r2.1 is smaller than the fourth radius r2.2.

A rotor 10 of a permanently excited synchronous machine whose radii r1.1, r1.2, r2.1 and r2.2 meet the above design parameters can be provided in a particularly space-saving manner with low weight, a high torque density and a high speed stability.

Such a rotor 10 is particularly suitable as a rotor of a permanently excited synchronous machine used as a drive unit in a motor vehicle, such as in a hybrid vehicle or an all-electric vehicle.

Preferably, the following ratios apply to the above four radii r1.1, r1.2, r2.1 and r2.2, relative to the outer radius ra of the rotor 10: The ratio r1.1/ra between the first radius r1.1 and the outer radius ra of the rotor is between 0.65 and 0.78, in particular between 0.68 and 0.75. The ratio r1.2/ra between the second radius r1.2 and the outer radius ra of the rotor is between 0.71 and 0.83, in particular between 0.74 and 0.8. The ratio r2.1/ra between the third radius r2.1 and the outer radius ra of the rotor is between 0.79 and 0.94, in particular between 0.82 and 0.92. The ratio r2.2/ra between the fourth radius r2.2 and the outer radius ra of the rotor is between 0.84 and 0.94, in particular between 0.87 and 0.94.

As stated above, in the region of each pole 12, the radially outwardly diverging second longitudinal center axes 33, 34 of the radially inner permanent magnet group 26 include the first angle $\gamma1$, and the second longitudinal center axes 35, 36 of the outer permanent magnet group 27 include the second angle $\gamma2$. The first angle $\gamma1$ is between 105° and 145°, the second angle $\gamma2$ is between 125° and 160°. The first angle $\gamma1$ is smaller than the second angle $\gamma2$.

Again, these design parameters serve to provide a rotor 10 with low weight, low installation space requirements, high torque density, and high speed stability.

Preferably, the following angular ranges apply to the first angle $\gamma1$ and the second angle $\gamma2$: The first angle $\gamma1$ is between 110° and 140°, in particular between 115° and 135°. The second angle $\gamma2$ is between 130° and 155°, in particular between 135° and 150°.

The weight of the rotor 10 according to an embodiment of the invention can be further reduced and its speed strength and torque density can be further increased if the following third and fourth angles are set as design parameters for straight lines extending through the center point of the rotor 10 and circumferentially outer points of permanent magnets 21, 22, 24, 25 accommodated in the lateral pocket-like recesses 14, 16, 18, 18.

Figure 2:
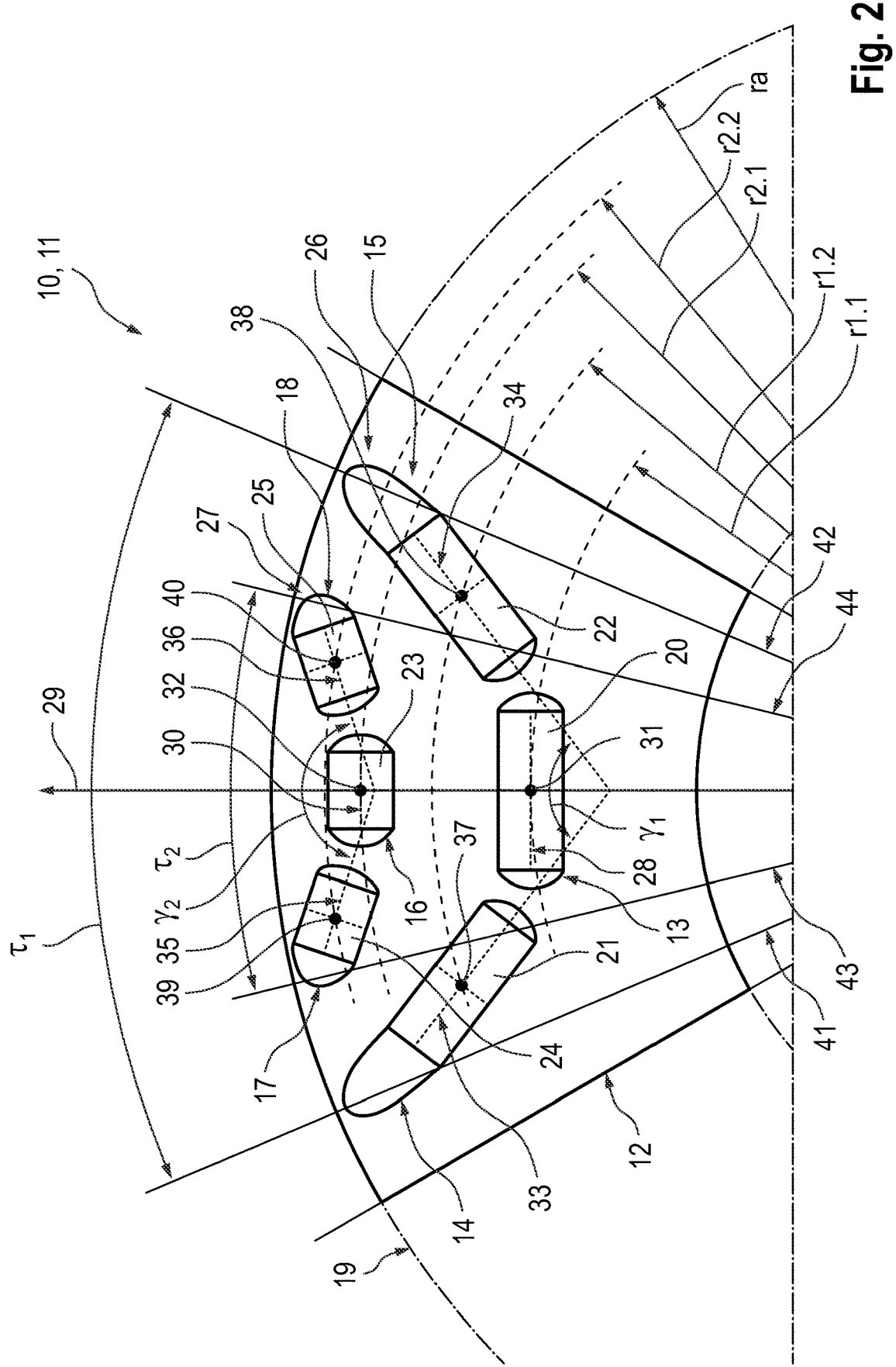
FIG. 2 illustrates an enlarged section of the rotor of FIG. 1 according to an embodiment of the invention.

FIGS. 1, 2 also show a straight line 41 extending through the center point of the rotor 10 and a circumferentially outer point of a permanent magnet 21 of the inner permanent magnet group 26 accommodated in a first lateral pocket-like recess 14, and a straight line 42 again extending through the center point of the rotor 10 and a circumferentially outer point of a permanent magnet 22 arranged in a second lateral pocket-like recess 15 of the inner permanent magnet group 26.

These two straight lines 41, 42 enclose the third angle $\tau1$, which is between 125° and 155° divided by the number of the pole pairs p. This angle $\tau1$ is a mechanical angle, and for the range 125° and 155° it is the corresponding electrical angle, where the mechanical angle is the electrical angle divided by the number of pole pairs.

FIGS. 1, 2 further show a straight line 43 again extending through the center point of the rotor 10 and a circumferentially outer point of the permanent magnet 24 of the radially outer permanent magnet group 27 accommodated in the first lateral pocket-like recess 17, and a straight line 44 extending through the center point of the rotor 10 and a circumferentially outer point of the permanent magnet 25 of the outer permanent magnet group 27 of the pole 12 shown, which is accommodated in the second lateral pocket-like recess.

In the region of each pole 12, these straight lines include a fourth angle τ2 between 70° and 105° divided by the number of the pole pairs. The angle τ2 is therefore again a mechanical angle, which results from the respective electrical angle divided by the number of pole pairs.

The third angle and fourth angle also serve to provide a lightweight, space-saving rotor 10 with high torque density and high speed stability.

Preferably, the following angular ranges apply to the third angle and fourth angle: The third angle τ1 is between 130° and 150° divided by the number of pole pairs, in particular between 135° and 145° divided by the number of pole pairs. The fourth angle τ2 is between 75° and 100° divided by the number of the pole pairs, and between 80° and 95° divided by the number of the pole pairs.

The third angle τ1 is larger than the fourth angle τ2.

As already explained, the rotor 10 is a rotor of a permanently excited synchronous machine, which is preferably used as a drive unit in a hybrid vehicle or also in an all-electric vehicle. Such an electric machine is used in particular in an all-wheel drive vehicle in the area of a so-called secondary axle, which supports the tractive power provided at a primary axle.

The outer radius ra of the rotor 10 is preferably between 50 mm and 80 mm. The number of pole pairs of the rotor 10 is preferably three or four, thus the rotor 10 preferably has six poles or eight poles.

Preferably, all permanent magnets 20, 21, 22 of the inner permanent magnet groups 26 of the poles 12 are of identical design, i.e., have identical dimensions. This is preferred in order to use as many common parts as possible.

Likewise, it is provided in particular that all permanent magnets 23, 24, 25 of the outer permanent magnet groups 27 of the poles 12 are of identical design, i.e., have identical dimensions. This is preferred in order to use as many common parts as possible.

The rotor 10 according to an embodiment of the invention is characterized by a low mass and a small installation space requirement. The rotor 10 according to an embodiment of the invention has a high torque density and high speed stability. Furthermore, the same has a low torque ripple. As a result of the high speed stability, an electric machine with a rotor 10 according to an embodiment of the invention can be operated at high speeds. As a result of the low torque ripple, the electric machine comprising the rotor 10 according to an embodiment of the invention is particularly quiet.

In a preferred embodiment of the rotor 10 according to the invention, all design parameters for the ratios of the radii r1.1, r1.2, r2.1, r2.2 to the outer radius ra and all conditions for the four angles γ1, γ2, τ1 and τ2 are combinatorially satisfied.

In a preferred embodiment of the rotor 10 according to the invention shown in FIG. 1, the pocket-like recesses 13, 14, 15, 16, 17, 18 accommodate the respective permanent magnets 20, 21, 22, 23, 24, 25 and are furthermore filled with air laterally adjacent to the respective permanent magnets 20 to 25, as viewed in the circumferential direction. Each of the permanent magnets 20 to 25 can be composed of several partial magnets.

A distance between directly adjacent pocket-like recesses 13 and 14 or 13 and 15 or 16 and 17 or 16 and 18 is in particular between 0.4 mm and 2.5 mm.

Also, a distance between the lateral pocket-like recesses 14, 15, 17, 18 and an outer wall of the rotor 10 is between 0.4 mm and 2.5 mm.

Such spacing between adjacent pocket-like recesses and between the lateral pocket-like recesses and the outer wall of the rotor is particularly to provide a desired speed stability for the rotor 10 even at high speeds of more than 10,000 revolutions or more than 15,000 revolutions per minute.

In particular, it is provided that when an electric machine comprising the rotor 10 according to an embodiment of the invention is integrated, the axis of rotation of the rotor 10 is coaxial with a vehicle drive axis with which the respective electric machine is associated.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rotor of an electrical machine designed as a permanently excited synchronous machine, comprising:
   a rotor base body having pocket-like recesses and permanent magnets positioned in the pocket-like recesses;
   poles which, viewed in a circumferential direction, are arranged alternately next to one another and form pole pairs,
   wherein, in a region of each pole, radially inner pocket-like recesses with radially inner permanent magnets arranged therein form a radially inner permanent magnet group and radially outer pocket-like recesses with radially outer permanent magnets arranged therein form a radially outer permanent magnet group,
   wherein, in a region of the respective radially inner and respective radially outer permanent magnet group, a first longitudinal center axis of a permanent magnet accommodated in a respective central pocket-like recess extends perpendicularly to a partly curved line which extends in a radial direction of the rotor and centrally divides the respective pole in the circumferential direction, wherein in the region of the respective radially inner and respective radially outer permanent magnet group, second longitudinal center axes of permanent magnets accommodated in respective lateral pocket-like recesses extend to the partly curved line of the respective pole such that the second longitudinal center axes of permanent magnets of the respective permanent magnet group accommodated on both sides of a respective central pocket-like recess in corresponding lateral pocket-like recesses diverge radially outward, wherein center points of permanent magnets of the radially inner permanent magnet groups of the poles accommodated in the central pocket-like recesses lie on a circular contour having a first radius, wherein a ratio between the first radius and an outer radius of the rotor is between 0.6 and 0.8, wherein center points of permanent magnets of the radially inner permanent magnet groups of the poles accommodated in first lateral pocket-like recesses and center points of permanent magnets of the radially inner permanent magnet groups of the poles accommodated in second lateral pocket-like recesses lie on a circular contour with a second radius, wherein a ratio between the second radius and the outer radius of the rotor is between 0.65 and 0.9, wherein center points of permanent magnets of the radially outer permanent magnet groups of the poles accommodated in the central pocket-like recesses lie on a circular contour having a third radius, wherein a ratio between the third radius and the outer radius of the rotor is between 0.78 and 0.95, wherein center points of permanent magnets of the radially outer permanent magnet groups of the poles accommodated in first lateral pocket-like recesses and center points of permanent magnets of the radially outer permanent magnet groups of the poles accommodated in second lateral pocket-like recesses lie on a circular contour with a fourth radius, wherein a ratio between the fourth radius and the outer radius of the rotor is between 0.8 and 0.95, wherein the first radius is smaller than the second radius, wherein the second radius is smaller than the third radius, and wherein the third radius is smaller than the fourth radius.

2. The rotor according to claim 1, wherein:
the ratio between the first radius and the outer radius of the rotor is between 0.65 and 0.78, and/or
the ratio between the second radius and the outer radius of the rotor is between 0.71 and 0.83, and/or
the ratio between the third radius and the outer radius of the rotor is between 0.79 and 0.94, and/or
the ratio between the fourth radius and the outer radius of the rotor is between 0.84 and 0.94.

3. The rotor according to claim 1, wherein:
the ratio between the first radius and the outer radius of the rotor is between 0.68 and 0.75, and/or
the ratio between the second radius and the outer radius of the rotor is between 0.74 and 0.8, and/or
the ratio between the third radius and the outer radius of the rotor is between 0.82 and 0.92, and/or
the ratio between the fourth radius and the outer radius of the rotor is between 0.87 and 0.94.

4. The rotor according to claim 1, wherein:
the radially outwardly diverging second longitudinal center axes of each radially inner permanent magnet group enclose a first angle $\gamma 1$ between 105° and 145°,
the radially outwardly diverging second longitudinal center axes of each radially outer permanent magnet group include a second angle $\gamma 2$ between 125° and 160°,
the first angle $\gamma 1$ is smaller than the second angle $\gamma 2$.

5. The rotor according to claim 4, wherein:
the first angle $\gamma 1$ is between 110° and 140°, and/or
the second angle $\gamma 2$ is between 130° and 155°.

6. The rotor according to claim 4, wherein:
the first angle $\gamma 1$ is between 115° and 135°, and/or
the second angle $\gamma 2$ is between 135° and 150°.

7. The rotor according to claim 1, comprising three or four pole pairs.

8. The rotor according to claim 1, wherein:
a straight line extending through the center point of the rotor and a circumferentially outer point of a permanent magnet of the radially inner permanent magnet group of a respective pole accommodated in a first lateral pocket-like recess, and a straight line, which extends through the center point of the rotor and a circumferentially outer point of a permanent magnet of the radially inner permanent magnet group of a respective pole accommodated in a second lateral pocket-like recess, include a third angle $\tau 1$ which is between 125° and 155° divided by a number of the pole pairs,
a straight line extending through the center point of the rotor and a circumferentially outer point of a permanent magnet of the radially outer permanent magnet group of the respective pole accommodated in a first lateral pocket-like recess, and a straight line, extending through the center point of the rotor and a circumferentially outer point of a permanent magnet of the radially outer permanent magnet group of the respective pole accommodated in a second lateral pocket-like recess, include a fourth angle $\tau 2$ which is between 70° and 105° divided by a number of the pole pairs, and
the third angle $\tau 1$ is greater than the fourth angle $\tau 2$.

9. The rotor according to claim 8, wherein:
the third angle $\tau 1$ is between 130° and 150° divided by the number of pole pairs, and/or
the fourth angle $\tau 2$ is between 75° and 100° divided by the number of pole pairs.

10. The rotor according to claim 8, wherein:
the third angle $\tau 1$ is between 135° and 145° divided by the number of pole pairs, and/or
the fourth angle $\tau 2$ is between 80° and 95° divided by the number of pole pairs.

11. The rotor according to claim 1, wherein the outer radius of the rotor is between 50 mm and 80 mm.

12. The rotor according to claim 1, wherein the pocket-like recesses receive the permanent magnets and are partially filled with air.

13. The rotor according to claim 1, wherein a distance between immediately adjacent pocket-like recesses of a radially inner permanent magnet group and a radially outer permanent magnet group is between 0.4 mm and 2.5 mm.

14. The rotor of claim 1, wherein a distance of the lateral pocket-like recesses from an outer wall of the rotor is between 0.4 mm and 2.5 mm.

15. An electric machine with a rotor according to claim 1, which is designed as a drive unit of a motor vehicle.

16. A motor vehicle, with an electric machine serving as a drive unit, comprising the rotor according to claim 1.

17. The electric machine of claim 15, wherein the motor vehicle is a hybrid vehicle or an electric vehicle.

\* \* \* \* \*